United States Patent Office 3,359,252
Patented Dec. 19, 1967

3,359,252
CARBENE ADDITION REACTION AND
COMPOUND
Friedrich Nerdel, Siegmundhof 4, Haus P. XII Stock, Berlin, Germany; Joachim Buddrus, Am Sandberg 10, Holzheim, Dusseldorf, Germany; Dieter Klamann, Wettloop 22a, Hamburg-Neugraben, Germany; Peter Weyerstahl, Schaaphusen 3, Hamburg-Hausbruch, Germany; and Klaus Ulm, Muhlenstieg 5, Fleestedt, Hamburg-Harburg, Germany
No Drawing. Filed Jan. 6, 1964, Ser. No. 336,073
Claims priority, application Germany, Jan. 7, 1963,
N 22,572, N 22,573, N 22,574
15 Claims. (Cl. 260—144)

ABSTRACT OF THE DISCLOSURE

This disclosure relates to the preparation of carbene derivatives by reaction of a carbene-forming compound, such as, e.g., one having the formula:

where X is a halogen and R and R' are hydrogen, halogen, alkyl, aryl, aralkyl, or alkaryl with structures which exclude β-elimination, and a carbene acceptor, such as, e.g., an organic compound having at least one unsaturated bond, usually carbon-carbon unsaturation, in the presence of (A) a compound of the formula:

where Z is oxygen, sulfur, or selenium, Y is a $C_2$–$C_6$ lower alkylene group, and R and R' are hydrogen, alkyl, alkene, or aryl, and (B) an ionic catalyst for promoting carbene formation consisting of an ion containing Lewis base. A number of the carbene derivatives thus prepared have utility as insecticides.

---

This invention is directed to the preparation of carbene addition products by a process which comprises reacting a carbene forming compound, with a carbene acceptor, viz, an organic compound having at least one unsaturated bond, in the presence of (A) a compound of the formula:

where Z is selected from the group consisting of: oxygen, sulfur and selenium, Y is a $C_2$ to $C_6$ lower alkylene group, and R and R' are selected from the group consisting of: hydrogen, alkyl, alkene and aryl, and (B) an ionic catalyst for promoting carbene formation. The compound (A) can be an epoxide (when Z is oxygen), an episulfide (when Z is sulfur), or an episelenide (when Z is selenium), or any other cyclic compound containing O, S, or Se. The ionic promoter catalyst can be any compound containing an ion capable of forming a pseudobase with the compound (A), esp., an ionic promoter containing halogen anions, e.g. halogen anion containing Lewis bases.

It is already known that carbenes of the general structure:

can be obtained by splitting hydrogen halides from compounds of the general formula:

where X is chlorine or bromine, and R and R' are hydrogen, halogen, phenyl or tertiary alkyl groups. Such carbenes are not stable, as such, and can therefore be shown to exist only with the aid of their subsequently formed product, viz, the reaction product of the:

and the unsaturated carbene acceptor. In the processes known to date, this hydrogen halide cleavage is carried out with strong bases (e.g., sodium ethoxide, sodium or potassium-tertiary-butylates, lithium-alkyl compounds, etc.) in the presence of a solvent. These known methods of carbene addition are disadvantageous due to the expensive nature of these processes and the presence of the strongly basic reaction medium, both of which seriously hinder the commercial acceptance of these methods of carbene addition product synthesis. Moreover, in the case where the carbene forming halogen containing compound is chloroform, the thermal splitting of chloroform into hydrochloric acid and dischlorocarbene requires very high temperatures thus further increasing the cost of the process and reducing the likelihood of its use for commercial preparation of these dichloro carbene addition products.

It has now been discovered that a cleavage of this type (and accompanying carbene formation) can be carried out in substantially neutral media without the use of a solvent using a suitable cyclic compound, usually epoxides, preferably ethylene oxide, under the catalytic influence of an ionic catalyst, preferably one containing halogen anions. The process of this invention has the advantages that the carbene addition reaction is conducted in a substantially neutral homogeneous reaction mixture from the beginning of the process to the end thereof at moderate reaction temperatures without the necessity for removing inorganic salts from the reaction mixtures at the end of the reaction. It can thus be seen that the entire procedure for preparing the carbene addition products is greatly simplified. It is thus believed that the process of the present invention is the first commercially available process for producing carbene addition products especially those involving the addition of dihalo carbene.

When using ethylene oxide and a suitable chlorine compound, the ethylene oxide is transformed during the reaction into ethylene chlorohydrin, which itself is a petrochemical product. Moreover, if desired, ethylene chlorohydrin can easily be retransformed back into ethylene oxide and recycled for further use in the reaction. The process of this invention opens up a number of applications of carbene chemistry, especially those involving dihalocarbene, which could not be undertaken previously due to the expensive nature of the carbene additions and the difficulty of isolating the end products when the carbene addition reactions were performed in accordance with prior art methods.

While any carbene forming compound can be employed in accordance with the procedure of this invention, it is preferred to use a halogen containing, carbene-forming compound of the formula:

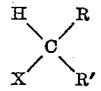

where X is a halogen, viz, selected from the group consisting of: chlorine, bromine, iodine and fluorine (but preferably chlorine or bromine), and R and R' are selected from the group consisting of: hydrogen, halogen (chlorine, bromine, iodine and fluorine), alkyl, aryl, aralkyl and alkaryl, with structures which exclude β-elimination, preferably with the proviso that the total number of carbon atoms of R and R' ranges from 1 to 20 carbon atoms.

Suitable halogen containing carbene-forming compounds within the above formula include, but are not limited to, the following: trichloromethane (chloroform); tribromomethane (bromoform); difluorochloro methane; dibromochloromethane; dichlorobromomethane; benzyl chloride; benzal chloride; methylene chloride; methyl chloride; methylene bromide; methyl bromide; benzyl bromide; benzal bromide; etc.

The term "compound A" as used herein is employed in a broad sense to indicate a cyclic compound containing an oxygen, sulfur, or selenium bridge in the alkylene moiety, e.g. epoxides, episulfides, or episelenides. While any cyclic compound capable of accepting the hydrogen halide acid split off during the carbene formation can be employed in the practice of this invention, it is preferred to employ a compound of the formula:

where Z is selected from the group consisting of: oxygen, sulfur, and selenium, Y is a $C_2$ to $C_6$ lower alkylene group, and R and R' are selected from the group consisting of: hydrogen, alkyl, alkene and aryl.

Suitable exemplary cyclic oxygen compounds which can be employed in accordance with the practice of this invention include, but are not limited to, the following: ethylene oxide; methyl ethylene oxide; dimethyl ethylene oxide; ethyl ethylene oxide; diethyl ethylene oxide; n-propyl ethylene oxide; di-n-propyl ethylene oxide; isopropyl ethylene oxide; di-isopropyl ethylene oxide; n-butyl ethylene oxide; di-n-butyl ethylene oxide; iso-butyl ethylene oxide; di-iso-butyl ethylene oxide; and the corresponding trimethylene oxides, tetramethylene oxides (tetrahydrofurans), pentamethylene oxides (tetrahydropyrans), hexamethylene oxides which can be unsubstituted or have R and/or R' substitutents which are alkyls, alkene or aryl groups. The epoxide compound of choice is ethylene oxide. The sulfides and selenides corresponding to the above cyclic oxides can likewise be employed. These compounds are the same as the oxides except that sulfur, and selenium respectively are present in place of oxygen.

It has been discovered that the process of this invention is of general application insofar as the carbene acceptor compounds are concerned. Thus, any organic carbene acceptor can be employed provided that it has at least one unsaturated bond in the molecule. Thus it can be seen that a wide variety of carbene-addition products can be produced in accordance with this invention. Usually, the compound acting as the carbene acceptor contains carbon to carbon unsaturation, e.g., 1 or more carbon to carbon double bonds or triple bonds. However, carbene-addition products can be prepared successfully where the carbon atom containing unsaturated bond of the carbene acceptor compound is a carbonyl group, or a C=N double bond, e.g. in a Schiff base, or a C=S double bond, e.g. in a thioketone or $CS_2$, or other C=Z double bonds where Z is any suitable hetero atom. But carbene addition products can also be prepared successfully where two hetero atoms form the unsaturated bond, e.g., in cases where the unsaturated bond is an N=N, N=O, N=S double bond etc.

Olefins constitute a suitable class of carbene acceptor compounds which can be employed. Olefinic carbene acceptors can be monoolefinically unsaturated, and they can be linear olefins, branched olefins, and cyclic olefins whether unsubstituted or substituted. Depending on the molar ratio of the carbene forming compound and the carbene acceptor, in case of polyolefinically unsaturated acceptors a mono-, bis-, or poly-addition of the carbene takes place. Suitable exemplary olefin carbene acceptor compounds which can be used in this invention include, but are not limited to, the following: ethylene; propylene; butylene; isobutylene; butadiene; cyclohexene; cyclohexadiene; isoprene (2-methylbutadiene-1,3); cyclooctatetraene; cycloheptatriene; cyclooctadiene; cyclooctatriene; cycloheptadiene; hexadecene-1; hexadecadiene-1,3; hexaoctadiene-1,3; cyclopentadiene; dicyclopentadiene; etc. As mentioned above, the olefinic carbene acceptor compounds can be substituted by groups which are inert to the carbene-addition reaction taking place. For example, such substituted olefinic compounds as trichloroethylene and hexachlorocyclopentadiene can be employed as the carbene acceptor compound. Moreover, the unsaturated carbene acceptor compounds can be aromatic, e.g., naphthalene; anthracene; etc. Carbene acceptors can be mono- or polycyclic compounds having olefinic and/or acetylenic unsaturated moieties, e.g., indene, diphenyl acetylene; diphenyl butadiene-1,3; etc.

Another suitable class of carbene acceptor compounds which can be employed are the organic carbonyl compounds. Suitable exemplary carbonyl compounds include, but are not limited to, the following: isobutyraldehyde, benzaldehyde, propionaldehyde, diphenyl ketone, acetone, diethyl ketone. Moreover organic ketenes of the type $R_2C=C=O$ can be used.

A further group of carbene acceptors which can be used in this invention are enol ethers containing one or more olefinically unsaturated groups in either one or both organic groups of the ether (R—O—R'). Thus the use of vinyl-alkyl ethers including cyclic vinyl ethers as carbene acceptors is contemplated herein. Suitable exemplary vinyl-alkyl ethers which can be employed as carbene acceptor compounds include, but are not limited to, the following: vinyl ethyl ether, vinyl n-propyl ether, vinyl iso-propyl ether, vinyl n-butyl ether, vinyl isobutyl ether, vinyl tert.-butyl ether; 2,3-dihydrofuran; 2,3-dihydropyran; etc.

Still another suitable class of carbene acceptors are enol esters.

A further class of suitable carbene acceptors include polymers containing unsaturated carbon to carbon bonds, e.g., butyl rubber, polybutadiene, polyisoprene, chlorinated butyl rubber, brominated butyl rubber, etc.; especially unsaturated polymers having 0.5 to 4 percent unsaturation and a molecular weight ranging from 300 to 100,000.

A wide variety of classes of carbene acceptors and a large number of specific compounds have been referred to herein as suitable carbene acceptors. It should be noted that any organic compound having an unsaturated bond can be employed as a carbene acceptor in accordance with this invention. Hence, the term "carbene acceptor" is broad in scope; and the process of this invention is general with regard to the carbene acceptor compound which can be employed therein.

Any ion containing carbene formation promoting catalyst can be used, among which a very suitable class of compounds are inorganic salts, e.g. lithium nitrate, magnesium chloride, calcium bromide, and anion containing Lewis bases, esp. anion containing nitrogen containing Lewis bases. Among the wide variety of anion containing, nitrogen containing Lewis bases which can be employed, the following classes of compounds can be cited as exemplary: tetraalkyl ammonium halides, esp., tetralower alkyl ammonium halides; tetraalkyl ammonium sulfates; tetraalkyl ammonium sulfonates; halogen anion containing hydrazonium salts and alkyl substituted halogen containing hydrazonium salts; pyridinium and alkyl pyridinium salts, esp., halogen anion containing lutidinium salts. The catalyst can also be formed in situ by reaction of a tertiary amine and a suitable alkylating agent. The alkylating agent can be the carbene forming compound or can be formed by component (A).

The preferred class of halogen anion containing nitrogen containing Lewis bases are the tetraalkyl ammonium halides. Suitable halogen anion containing tetraalkyl ammonium halides which can be employed include, but are not limited to, the following: tetraethylammonium bromide; tetraethylammonium chloride; tetraethylammonium fluoride; tetraethylammonium iodide; tetramethylammonium bromide, chloride, iodide, and fluoride; tetra n-propyl ammonium bromide, chloride, iodide, and fluoride; tetraiso-propyl ammonium bromide, chloride, iodide and fluoride; tetra n-butyl ammonium bromide, chloride, iodide and fluoride, tetra iso-butyl ammonium bromide, chloride, iodide fluoride; etc. The tetra-lower alkyl ammonium halides work very well. The tetra-lower alkyl ammonium halides of choice are the tetra-lower alkyl ammonium bromides, viz, the tetra alkyl ammonium bromides containing from 1 to 4 carbon atoms per alkyl group, especially tetra ethyl ammonium bromide.

The carbene addition reactions contemplated herein can be conducted in the liquid or gaseous phase at reaction temperatures ranging from 0 to 300° C. for reaction periods widely ranging from 60 seconds to about 48 hours (with the longer reaction times coinciding with the lower temperatures and vice versa) at pressures ranging from 0.5 to 500 atmospheres. Usually, however, the reactions will be conducted at temperatures ranging from 100° to 250° C., and more preferably from 150° to 200° C. for reaction periods ranging from 0.5 hours to 24 hours, and more preferably from 0.5 hours to about 10 hours.

It is desirable to employ a mole ratio of carbene forming compound to carbene acceptor ranging from 0.5 to 6:1. Usually, the mole ratio of carbene forming compound to carbene acceptor ranges from 1 to 4:1, and more preferably from 1 to 3:1. The mole ratio of compound (A) to carbene forming compound can range from 0.1 to 6:1, usually ranges from 0.2 to 4:1, and preferably ranges from 0.2 to 3:1.

Usually, the ion containing catalyst, e.g., a halogen anion containing Lewis base, is employed in amounts sufficient to establish a mole ratio of halogen anion containing catalyst to carbene forming compound(s) ranging from less than 0.0001 to 1:1, usually from 0.001 to 0.8:1, and preferably 0.002 to 0.7:1.

The carbene-addition reactions contemplated herein can be conducted satisfactorily at atmospheric pressure with or without reflux conditions in sealed reactors such as glass tubes or glass lined cyclinical bomb-type reactors. Of course, the reactions can likewise be conducted at sub-atmospheric or elevated pressure, viz, pressure ranging from 0.5 to about 500 atmospheres, usually from about 1 to about 100 atmospheres, and more frequently at pressures from 1 to 50 atmospheres. Instead of using glass reactor vessels, other inert materials can be employed for the reaction vessel.

One salient advantage of the instant process resides in the fact that since no solvent is employed as a reaction medium, the feed stocks not initially reacted can be recovered readily and recycled back for further reaction. Considering this fact, in most cases the yield relative to the amount of reactive feed products can amount to up to 90% and even higher in certain cases.

Investigations on the mechanism of the new reaction lead to the theorized conclusion that the catalyst, e.g., the tetraalkyl ammonium halides, transform compound (A), e.g. the epoxide, into a pseudo-base which induces the splitting off of a proton from the carbene forming compound, e.g., a lower alkyl trihalide like chloroform. This is shown graphically in Equations 1 and 2 below where the epoxide is ethylene oxide.

EQUATION 1

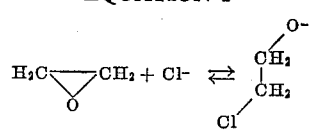

EQUATION 2

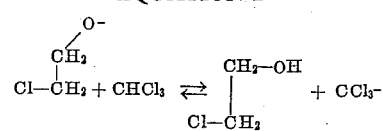

The trichloromethyl anion formed undergoes a decomposition leading to dichlorocarbene and a chloride anion. This reaction is shown graphically in Equation 3 below.

EQUATION 3

The dichlorocarbene reacts with any compound suitable as a carbene acceptor, e.g. olefins, etc. The reactions of dichloro carbene with a cycloolefin, viz, cyclohexene, and an acyclic olefinic site, e.g. as present in isobutene and butadiene, are illustrated in Equations 4 and 5, respectively.

EQUATION 4

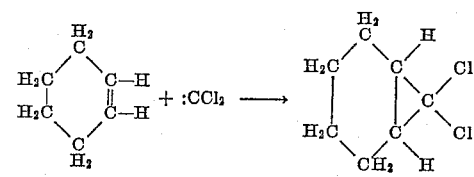

EQUATION 5

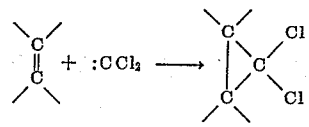

Since these reactions leading to carbene formation and subsequent addition appear to be equilibrium reactions, then every compound capable of transforming the epoxide into this type of a pseudo-base will catalyze the carbene formation and addition. Of course, it should be realized that the present invention is not necessarily dependent upon this or any other theory for the successful operation thereof.

The present invention will be further understood with reference to the examples which follow. However, it should be noted that the present invention in its broadest aspects is not necessarily limited to the specific carbene forming compounds, carbene acceptors, cyclic compounds, ionic catalysts; reaction temperatures; times periods, etc., as set forth hereinbelow in the examples. It also should be noted that in some cases the primary carbene addition products can not be isolated but form consecutive products.

*Example 1.—Preparation of dialkyl, dihalo cycloalkanes*

20 milliliters of trichloromethane (0.25 mole), 12 milliliters of ethylene oxide (0.24 mole), 21 milliliters of isobutylene (cooled to about −20° C.; 0.22 mole; purity 90%) and a spatula tip of tetraethyl ammonium bromide (TAB) are inserted into a bomb tube and heated at 170° C. for 6 hours. The distillation normally carried out after opening the bomb tube in this case does not lead to separation of reaction products because of the proximity of the boiling points of the end products. Ethylenechlorohydrin is therefore removed by shaking the mixture 3 times with water; then the mixture is dried ($CaCl_2$) and distilled. At 118–121° C., 2,2-dimethyl-1, 1-dichlorocyclopropane distills over; 18.4 grams; 66%. An autoclave can be used instead of the bomb tube. This compound is useful as an insecticide.

*Example 2.—Preparation of alkenyl, dihalo cycloalkanes*

17 milliliters of chloroform, viz, trichloromethane (0.21 mole), 15 milliliters of ethylene oxide (0.30 mole), 16.6 milliliters of butadiene (0.2 mole) and a spatula tip of tetraethyl ammonium bromide were reacted in a bomb tube heated at 170° C. for 6 hours. 16.7 grams of 2-vinyl-1,1-dichloro cyclopropane were isolated from the reaction products for a 61% yield. The 2-vinyl-1,1-dichlorocyclopropane has a boiling point of 125° C., and is useful as a monomer for forming polymers, both by homopolymerization and copolymerization. Ethylene chlorohydrin is also isolated.

*Example 3.—Preparation of dihalo, bicycloalkanes*

20 milliliters of trichloromethane (0.25 mole), 12 milliliters of ethylene oxide (0.24 mole), 21 milliliters of cyclohexene (95% pure; 0.2 mole) and a spatula tip (0.002 mole) of tetraethyl ammonium bromide are heated at a temperature of 170° C. for six hours in a bomb tube. The subsequent fractionation yields 9 grams of ethylenechlorohydrin (B.P.$_{13}$ of 35.5° C.) and 20 grams of bicyclo (0,1,4)-2,2-dichloroheptane in 61% yield. The B.P.$_{13}$ of this latter compound is 77° to 79° C.

*Example 4.—Preparation of halobicyclic arenes*

11.6 milliliters of indene (0.1 mole), 9 milliliters of trichloromethane (0.11 mole), 15 milliliters of ethylene oxide (0.30 mole) and a spatula tip of tetraethyl ammonium bromide are heated for 2 hours at a temperature of 170° C. in a bomb tube reactor. Subsequent distillation yields 17.5 grams of ethylenechlorohydrin, B.P.$_{13}$ of 35° C., and 13.5 grams of beta-chloronaphthalene, B.P.$_{13}$ of 120° to 125° C.; 83% yield.

Examples 3 and 4 particularly show the simplicity of the process of this invention.

*Example 5.—Preparation of alkenyl, dihalo cycloalkanes*

86.5 grams of difluorochloromethane (1.0 mole), 52.9 grams of ethylene oxide (1.2 moles), 54.1 grams of butadiene (1.0 mole) and 0.6 gram of tetraethyl ammonium tosylate (0.002 mole) were reacted in a stainless steel autoclave heated at 180° for 5 hours. 49.9 grams of 2-vinyl-1,1-difluorocyclopropane were isolated from the reaction products for a 48% yield. The 2-vinyl-1,1-difluorocyclopropane has a boiling point of 49–51° C., and is useful as a monomer for forming fluorine containing polymers. Ethylene chlorohydrin is also isolated.

*Example 6.—Preparation of dihalo, bicycloalkanes*

43.3 grams of difluorochloromethane (0.5 mole), 22.0 grams of ethylene oxide (0.5 mole), 41.0 grams of cyclohexene (0.5 mole) and 0.2 gram of lithium chloride (0.005 mole) are heated at a temperature of 170° C. for six hours in a stainless steel autoclave. 67.3 grams of bicyclo (0,1,4)-2,2-difluoroheptane were isolated from the reaction products for a 51% yield. The B.P. of this compound is 123–124° C. Ethylene chlorohydrin is also isolated.

*Example 7.—Preparation of tetrahalo, bis-cycloalkanes*

34 milliliters of chloroform (0.42 mole), 30 milliliters of ethylene oxide (0.60 mole), 16.6 milliliters of butadiene (0.2 mole) and a spatula tip of tetramethyl ammonium chloride were reacted on a bomb tube heated at 170° C. for 5 hours. Besides 7.8 grams of 2-vinyl-1,1-dichlorocyclopropane (see Example 2) 17.6 grams of 2,2,2',2'-tetrachlorobicyclopropyl were isolated from the reaction products for a 40% yield. The latter compound has a boiling point (5 millimeters pressure) of 66–70° C. and a melting point of 74–75° C., and is useful as an insecticide.

*Example 8.—Preparation of aryl dioxolanes*

21.2 grams of benzaldehyde (0.2 mole), 12 milliliters of ethylene oxide (0.2 mole), and a spatula tip of tetra ethyl ammonium bromide are heated for 2 hours at a temperature of 170° C. in a bomb tube reactor. Subsequent distillation yields 22.5 grams (75%) of 2-phenyl dioxolane, B.P.$_{12}$ of 107° to 108° C.

*Example 9.—Preparation of dialkyl dioxolanes*

18.2 milliliters of isobutyraldehyde (0.2 mole), 12 milliliters of ethylene oxide (0.24 mole) and a spatula tip of tetraethyl ammonium bromide (approximately 0.002 mole) are heated in a bomb tube for 2 hours at a temperature of 170° C. After separation of a small aqueous layer, isolation is carried out by distillation to yield 16 grams of 2-diisopropyl dioxolane. This compound has a boiling point of 120° to 123° C. The yield of this compound is approximately 69%.

*Example 10.—Preparation of halogen substituted functional R—O—R—O—R diethers*

10 milliliters of vinyl ethyl ether (0.1 mole), 12 milliliters of ethylene oxide (0.24 mole), 20 milliliters of trichloromethane and a spatula tip of tetraethyl ammonium bromide (approximately 0.002 mole) are heated in a bomb tube for 2 hours at 170° C. Cooling is followed by fractionation at 35° C. (13 millimeters pressure) and ethylenechlorohydrin distills off. At 95° C. (13 millimeters pressure), trans-α-chloroacroleinethyl-(β-chloroethyl)-acetal distills off. The yield of the latter compound is 13 grams (66%). This compound represents the enol chloride acetal of malondialdehyde.

*Example 11.—Preparation of halogen substituted cycloolefin derivatives*

18 grams of anthracene (0.1 mole), 15 milliliters of ethylene oxide (0.3 mole), 20 milliliters of trichloromethane and a spatula tip of tetraethyl ammonium bromide are heated at a temperature of 180° C. for six hours in a bomb tube. After filtering unreacted anthracene (3 grams), the dark solution is evaporated to dryness. The residue is boiled with about 300 milliliters of methanol. From the methanolic solution, 14 grams (58% yield based on reacted anthracene) of 2,3 - 6,7 - dibenzo-4-chloro-1-(beta-chloroethoxy)-cycloheptatriene ($C_{17}H_{14}Cl_2O$) precipitate overnight in the form of needles having a max. of 180 m$\mu$. These needles are soluble in sulfuric acid forming a deep red solution. This compound is useful as an insecticide. Thus, it can be seen, that anthracene can be converted into cycloheptatriene derivatives having insecticidal utility in a simple manner.

What is claimed is:
1. A process for the preparation of carbene derivatives which comprises reacting a carbene acceptor having at least one unsaturated bond with a halogen containing carbene forming compound of the formula:

where X is a halogen, and R and R' are selected from the group consisting of: hydrogen, halogen, alkyl, aryl, aralkyl and alkaryl with structures which exclude β-elimination, in the presence of (A) a compound of the formula:

where Z is selected from the group consisting of: oxygen, sulfur, and selenium, Y is a $C_2$ to $C_6$ lower alkylene group, and R and R' are selected from the group consisting of: hydrogen, alkyl, alkene, and aryl; and (B) an ionic catalyst for promoting carbene formation consisting of an anion containing Lewis base.

2. A process according to claim 1 wherein said anion containing Lewis base is a tetraalkyl ammonium halide.

3. A process according to claim 1 wherein said compound (A) is a cyclic oxide of the formula:

where Y is a $C_2$ to $C_6$ lower alkylene group, and R and R' are selected from the group consisting of: hydrogen, alkyl, alkene and aryl.

4. A process according to claim 1 wherein said carbene acceptor contains at least one carbon containing unsaturated bond.

5. A process according to claim 1 wherein said carbene acceptor contains a nitrile group.

6. A process according to claim 1 wherein said carbene acceptor contains a hetero-hetero atom unsaturated bond selected from the group consisting of N=N, N=O, and N=S.

7. A process according to claim 1 wherein the mole ratio of carbene forming compound to carbene acceptor is 0.5 to 6:1.

8. A process according to claim 1 wherein the mole ratio of epoxide to carbene forming compound is 0.1 to 3:1.

9. The process according to claim 1 wherein said carbene acceptor contains carbon to carbon unsaturation.

10. A process for preparing cyclic halogen substituted hydrocarbons which comprises reacting trichloromethane with carbene acceptor having at least one unsaturated bond in the presence of an epoxy compound of the formula:

where Y is a $C_2$–$C_6$ lower alkylene group and R and R' are selected from the group consisting of: hydrogen, alkyl, alkene, and aryl and a tetraalkyl ammonium halide at a temperature ranging from 100 to 250° C.

11. A process according to claim 10 wherein said unsaturated hydrocarbon is an olefin.

12. A process according to claim 10 wherein said unsaturated hydrocarbon is an aromatic compound.

13. A process for preparing carbene derivatives which comprises reacting trichloromethane with a carbene acceptor having at least one unsaturated bond in the presence of ethylene oxide and tetraethyl ammonium bromide.

14. A process of preparing haloalkoxy substituted unsaturated organic compounds which comprises reacting a dihalocarbene forming compound with an enol ether in the presence of ethylene oxide and a tetraalkyl-ammonium halide.

15. 2,3 - 6,7 - dibenzo - 4 - chloro - 1 - (beta - chloroethoxy) cycloheptatriene.

References Cited
UNITED STATES PATENTS
2,950,328    8/1960    Orchin _____ 260—648
3,062,754    11/1962    Young et al.

F. D. HIGEL, *Primary Examiner.*

JOSEPH P. BRUST, *Examiner.*